Feb. 11, 1969　　　　C. E. BOHNENBLUST　　　　3,427,538
APPARATUS TO IDENTIFY CONDUCTOR PAIRS IN A MULTICONDUCTOR
CABLE BY GATING IDENTIFICATION SIGNALS IN RESPONSE TO
PROBE DETECTION OF AN ENERGIZED CONDUCTOR PAIR
Filed Nov. 1, 1966
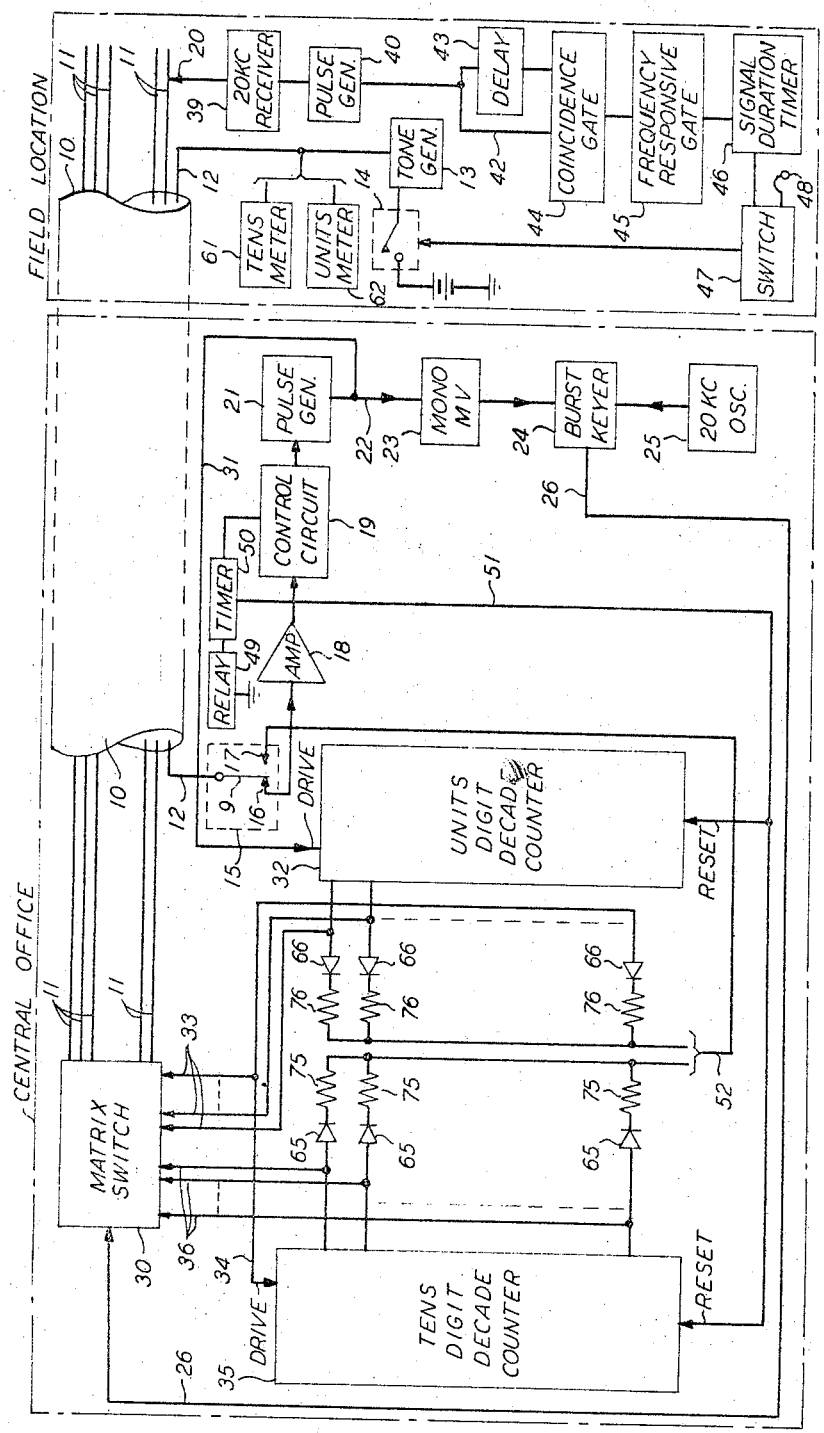
INVENTOR
C. E. BOHNENBLUST
BY John K. Mullerney
ATTORNEY United States Patent Office 3,427,538
Patented Feb. 11, 1969

3,427,538
APPARATUS TO IDENTIFY CONDUCTOR PAIRS IN A MULTICONDUCTOR CABLE BY GATING IDENTIFICATION SIGNALS IN RESPONSE TO PROBE DETECTION OF AN ENERGIZED CONDUCTOR PAIR
Clarence E. Bohnenblust, Saratoga, Calif., assignor to American Telephone and Telegraph Company, New York, N.Y., a corporation of New York
Filed Nov. 1, 1966, Ser. No. 591,286
U.S. Cl. 324—66 6 Claims
Int. Cl. G01r 19/00; H04b 3/46

ABSTRACT OF THE DISCLOSURE

A signal stepping arrangement driven by a counter applies a signal in sequence to a plurality of conductor pairs in a multiconductor cable at the central office. In response to probe detection of the signal on a conductor pair at the field location, the counter halts counting and transmits an identification signal to the field location identifying the conductor pair to which the probe is connected.

This invention relates to the automatic identification of conductor pairs in a multiconductor cable such as are used in telephone communication systems and, more particularly, to apparatus to automatically numerically identify a conductor pair selected at random.

Presently the identification of conductor pairs in a multiconductor cable is in most instances performed manually. Workmen are stationed at opposite ends of the cable. The workman at one end applies a tone signal to a selected conductor pair. He then transmits the identification of the selected conductor pair to the workman at the other end, via an auxiliary communication channel. The workman at the other end manually probes for the selected conductor pair carrying the tone signal and after locating it tapes it with its identification number. The procedure is repeated until all the conductor pairs are identified. This manual identification procedure is both slow and subject to error.

The automatic identification of conductor pairs has many advantages over the conventional manual method. In general, only one workman is needed at one end of the cable, thereby reducing the manpower requirements. Additionally the automatic identification of conductor pairs is both faster and more accurate than the manual procedure.

In one particular automatic conductor pair identification apparatus, the identified conductor pairs at one end of the cable have their respective tip and ring leads connected to a resistance terminal board. Each tip and ring lead is connected to a unique resistance combination of the terminal board. A signal tone is applied simultaneously through the resistances to all the conductor pairs connected to the terminal board. The signaling tone is received at the other end in each conductor pair. The signaling tone in each conductor pair has a distinctive unique magnitude combination in its tip and ring leads. Each conductor pair is uniquely identified by measuring the magnitude of the signals transmitted in its tip and ring leads. While the aforementioned system is fast and accurate, it is necessary to disconnect the cable from customer service to perform the identification operation. One such system, for instance, is disclosed in G. W. Bates et al. Patent 3,054,949, issued Sept. 18, 1962.

An alternative approach to the automatic identification of conductor pairs is found in a system which utilizes two synchronized counters to simultaneously count at opposite ends of the cable. The counter at the central office sequentially gates an ultrasonic signal to each one of the conductor pairs. This ultrasonic signal, detected by a probe connected to a conductor pair selected at random at the field location, is utilized to halt the counting of the two synchronized counters. The count at which the counter at the field location is stopped indicates the identification of the particular conductor pair to which the probe was connected. One such system is disclosed, for instance, in my copending application Ser. No. 315,128, filed Oct. 10, 1963 now U.S. Patent 3,288,943, issued Nov. 29, 1966. This particular system of identification, however, requires the inclusion of a counter in the equipment at the field location which impedes equipment mobility. Additionally, it is necessary to be careful to keep both counters in synchronism. Should synchronism be lost, a false identification count will be perpetuated in the identification of all the conductor pairs.

It is an object of the invention to automatically identify conductor pairs in a multiconductor telephone cable at the field location termination of the cable with a high degree of accuracy and a minimum of complex equipment.

It is another object of the invention to identify conductor pairs in a multiconductor telephone cable without the necessity of removing it from customer service.

It is yet another object to utilize a counting mechanism in the identification of conductor pairs in a multiconductor telephone cable without the necessity of having a synchronized counter at the field location.

Therefore, in accordance with the present invention, an apparatus is provided to enable a single operator at the field location of a multiconductor cable to identify individual conductor pairs. A two-kilocycle tone signal generated at the field location is transmitted, via a spare conductor pair, to the central office to drive a pair of decade counters representing, respectively, tens and units digits. The two counters, in response to the two-kilocycle tone signal, step signals progressively to each of their respective tens and units output leads. These stepped signal outputs are utilized to gate 20-kilocycle signal bursts to each one of the individual conductor pairs in a sequential fashion. A probing means is connected by the operator to a conductor pair selected at random at the field location. A 20-kilocycle signal burst detected by the probe means is utilized to turn off the two-kilocycle signal tone and, hence, halt the progressive signal stepping of the counters at the central office. Each individual output of the two counters is connected to a different and unique resistance. The individual signal outputs of the two halted counters are applied through their respective unique resistances, via the spare conductor pair, to the field location. A signal magnitude measuring device at the field location measures the signal transmitted by the spare conductor pair and thereby uniquely identifies the conductor pair selected at random.

A feature of the present invention is a signal burst detector designed to detect the 20-kilocycle signal burst transmitted over the conductor pair to which the probe is attached without the danger of false operation of the signal burst detection equipment due to random noise signals. The selective detection of the signal burst is accomplished by delaying a 20-kilocycle signal burst for a finite period and comparing the coincidence of the delayed bursts with subsequent undelayed bursts. Selection is additionally refined by measuring the frequency and duration of the detected signal burst.

It will be apparent to those skilled in the art that applicant's invention advantageously does not transmit the signal identifying a particular conductor pair over the conductor pair being identified, but rather transmits that signal over a spare conductor pair. The 20-kilocycle signal burst on the conductor pair being identified is short in duration and above the audio range and does not interfere with customer audio signals. Hence, customer service may be continued during the identification process. It is also apparent that by utilizing the counter at the central office to generate the identification signal no corresponding synchronized counter is required at the field location, thereby reducing the amount of equipment needed at the field location, and improving equipment mobility.

These and other objects and features, the nature of the present invention, and its various advantages will be more readily understood upon consideration of the attached drawing and of the following detailed description thereof.

Referring now more particularly to the drawing, a schematic block diagram of one particular embodiment of the invention is disclosed which illustrates the mode of operation of the invention.

A multiconductor cable 10 comprising a plurality of conductor pairs 11 is illustrated as joining a central office to some remote location in the field. The cable, in addition to the unidentified conductor pairs 11, has an easily identifiable spare conductor pair 12 which is used as a control wire and information carrying connection from identifying equipment in the field to equipment at the central office. For illustrative purposes it is assumed that the multiconductor cable 10 contains 100 conductor pairs 11 plus the additional spare conductor pair 12. It is to be understood that the principle of the invention works equally well should the cable contain a different number of conductor pairs.

The operation of the apparatus is initiated by a single operator at the field location who attaches the probe 20, described herein below, to an unidentified conductor pair 11 whose numerical identification is desired to obtain. The operator activates the tone generator 13 by closing the switch 14. The activated tone generator 13 applies a two-kilocycle tone signal, via the spare conductor pair 12, to the two-pole relay 15 at the central office location. The relay 15 has two contacts 16 and 17. The relay armature 9 in its normal position is connected to contact 16. The tone signal transmitted by the spare conductor pair 12 is transmitted, via contact 16 to an amplifier 18 and from thence to a control circuit 19. The control circuit 19 is a multistate circuit which responds to the application and removal thereof of the two-kilocycle tone signal. The specific design of such a circuit will be obvious to those skilled in the art and need not be discussed in detail. The control circuit 19 in response to the application of the two-kilocycle tone signal generates a direct current output signal which is applied to the energizing input of the pulse generator 21. The pulse generator 21 in response thereto continually generates a train of narrow pulses. The repetition rate of the pulses for illustrative purposes is assumed to be 60 cycles per second. The pulse generator 21 may comprise a relaxation oscillator or some other suitable circuit known in the art.

The pulse train output of the pulse generator 21 is applied, via lead 22, to a monostable multivibrator 23. The monostable multivibrator 23 in response to each pulse of the pulse train generates rectangular wave pulses. The duration of these rectangular wave pulses is for illustrative purposes assumed to be one millisecond. These rectangular wave pulses are applied to a burst keyer 24, which in response thereto, enables one millisecond duration bursts of the 20-kilocycle signal generated by an oscillator 25 which is transmitted to the output lead 26. The 20-kilocycle signal bursts of a one millisecond duration, on lead 26, are transmitted thereon to the matrix switch 30. The burst keyer 24 may comprise an amplitude modulator circuit which modulates the carrier generated by the oscillator 25 in accordance with the pulse output of the monostable multivibrator 23. Such circuits are well known in the art.

The output of the pulse generator 21 is also applied, via lead 31, to the driving input of the units digit decade counter 32. The units digit decade counter 32 has ten individual stages, one stage of which is always in an energized state. The energized state advances from one stage to a succeeding one of the ten stages in response to each pulse applied to it, via lead 31. The output of each energized stage of the units digit decade counter 32 is applied, via the leads 33, to the matrix switch 30. The energized output of the last stage of the units digit decade counter 32 is also applied, via lead 34, to the driving input of a tens digit decade counter 35 which is identical to the decade counter 32. The tens digit decade counter 35, in response thereto, steps an energized state, which exists in one of its ten stages, to a succeeding stage. The stepped output of the tens digit decade counter 35 is applied, via the leads 36, to the matrix switch 30. The decade counters 32 and 35 may comprise any counter having ten stages each capable of generating an output signal.

The matrix switch 30 is a commutating circuit which, in response to the output of the tens and the units digit decade counters 35 and 32, enables the sequential application of the 20-kilocycle signal bursts, applied to it via lead 26, to the conductor pairs 11. Each unique combination of the combined outputs of the units and tens digits decade counters enables the matrix switch 30 to gate a 20-kilocycle signal burst to a selected one of the conductor pairs 11. Commutating devices such as the matrix switch 30 are well known in the art, and it is not believed necessary to discuss such a circuit in detail.

The 20-kilocycle signal bursts, as hereinabove described, are sequentially stepped to each individual one of the conductor pairs 11 and transmitted thereon to the field location. The probe device 20 connected to a conductor pair 11, selected at random at the field location, upon detection of a 20-kilocycle signal burst, applies it to a 20-kilocycle signal receiver 39. The signal receiver 39 is a threshold responsive signal gating device adjusted to respond to some predetermined signal level. This signal level is preset to avoid responses to 20-kilocycle signals which have spread to adjacent conductor pairs through electromagnetic coupling.

The probe 20 is preferably a capacitive probe which allows it to detect a signal on one of the conductor pairs 11 without removing the insulation of that pair. A suitable probe mechanism for the purpose of the present invention is disclosed in R. M. Scarlett, Patent 3,181,062, issued Apr. 27, 1965.

The 20-kilocycle signal receiver 39 transmits the 20-kilocycle signal bursts to a pulse generator 40. The pulse generator 40 generates a pulse signal for each burst of the applied 20-kilocycle signal burst. The pulses generated by the pulse generator 40 are applied in parallel, respectively, via lead 42 and a delay circuit 43, to a coincidence gate 44. The pulses are delayed by the delay circuit for a time period equal to at least one cycle of the 20-kilocycle signal burst or a multiple thereof. The coincidence gate 44 transmits only the coincident delayed and nondelayed pulses, therefore assuring that random recurring spurious noise pulses will not falsely activate the field detection apparatus.

The pulse output of the coincidence gate 44 is applied to a frequency responsive gate 45. The frequency responsive gate 45 transmits the incident pulse signals only if the pulses recur at some predetermined repetition rate, thereby further assuring that spurious noise pulses recurring randomly will not falsely activate the field detection apparatus. The frequency responsive gate 45 in the illustrative embodiment is designed to respond only to pulse signals with a 20-kilocycle repetition rate. The output of the frequency responsive gate 45 is applied to a signal duration timer circuit 46. The signal duration timer circuit 46 generates an output pulse signal only in response to an input pulse train which has exceeded some preselected duration.

It is readily apparent from the foregoing that the described signal burst detection apparatus is highly immune to false operation due to random noise signals. Reliable detection of the signal bursts is achieved by testing the received signal burst for uniformity, by comparing a delayed portion of the signal with an undelayed portion. The signal burst is additionally tested for a selected repetition rate and for a predetermined duration. The burst detection apparatus, such as described above, is highly reliable and greatly decreases the danger of the false identification of conductor pairs.

The output pulse signal of the signal duration timer circuit 46 is applied to a switch circuit 47, which in response thereto transmits a pulse signal to the tone generator 13 turning it off and to the audio signaling device 48 (e.g. headset) which informs the workman of the receipt of the signal burst on the selected conductor pair.

With the tone generator 13 deactivated, the two-kilocycle signal transmitted, via the spare conductor pair 12, is terminated. The control circuit 19 in response to the termination of the two-kilocycle tone signal switches into a state which applies an activating signal, via a timer circuit 50, to the relay coil 49. The activated relay coil 49 causes the armature 9 of the double-pole relay 15 to switch to the contact 17. The timer circuit 50 deactivates the relay coil 49 and thereby permits the release of the armature 9 from the contact 17 after a short period of time, which in the illustrative embodiment is approximately three seconds. With the armature 9 connected to contact 17, a signal identifying the selected conductor pair, to which the probe is attached, is transmitted to the field location, via the spare conductor pair 12, in the manner described hereinbelow.

Upon the removal of the two-kilocycle tone signal from the spare conductor pair 12, control circuit 19, as hereinabove described, changes state, and the signal activating the pulse generator 21 is removed. Accordingly, the counting of the two decade counters 32 and 35 is halted. The energized signals existing at the stages at which the individual decade counters 32 and 35 halt are applied, respectively, via the output diodes 66 and 65 and the resistances 76 and 75 to lead 52, which comprises a tip and ring.

Each of the aforementioned resistances 76 and 75 has a unique impedance value indicative of the numerical designation of the stage of the counter to which it is attached. These resistances 76 and 75 determine the output level of the output signal of the energized stage of each of the counters 32 and 35. This signal is applied, respectively, to the tip and ring of lead 52 and has a magnitude on the tip and ring respectively representative of a tens and units numerical designation corresponding to the identity of the conductor pair to which the probe 20 is attached at the field location.

The signals on the tip and ring of lead 52 are respectively transmitted, via the relay 15 and the spare conductor pair 12, to a tens meter 61 and a units meter 62 at the field location. The tens meter 61 and the units meter 62, respectively, measure the signal magnitude of the numerical identification signals transmitted on the tip and ring of the spare conductor pair 12. The meters 61 and 62 may comprise voltmeters or ammeters calibrated to convert signal magnitudes into numerical designations. It is to be understood that while lead 52, the relay 15 and contact 17 and the spare conductor pair 12 are shown in the drawing as a single conductor, the aforementioned leads actually comprise conductor pairs having tip and ring conductors.

The timer 50, which is connected to the control circuit 19, releases the armature 9, connected to contact 17, by removing the coil energizing current after a short time interval, which in the illustrative embodiment is approximately three seconds. The timer 50 additionally applies a signal, via lead 51, to reset both the tens digit decade counter 35 and the units digit decade counter 32 in readiness for a subsequent identification operation.

It is to be understood that while certain signal frequencies and signal durations have been specified for illustrative purposes, many other frequencies and durations may be readily substituted by those skilled in the art.

While the conductor pair identification system of the present invention has been described in connection with identifying conductors in a telephone cable, it is to be understood that this embodiment is simply illustrative of the many possible arrangements which can represent applications of the principles of the invention. The other applications can readily be devised by those skilled in the art without departing from the spirit or scope of this invention.

What is claimed is:

1. In combination, a multicoductor cable comprising a plurality of conductor pairs including a spare conductor pair and interconnecting a central office and a field location, a source of energizing signals at the field location, counting means at the central office, means to interconnect said counting means and said energizing source via said spare conductor pair, said counting means including a plurality of interconnected signal switching stages, and stepping a predetermined signal state along said stages in response to said energizing signals, each of said signal switching stages representing numerical designations and including an output circuit having a particular output impedance indicative of the numerical designation of that stage, ultrasonic signal burst generation means at said central office, signal burst gating means to couple said ultrasonic signal burst generation means to said plurality of conductor pairs, said signal burst gating means coupled to said counting means and responsive to the stepping of said predetermined signal state by said counting means to apply ultrasonic signal bursts generated by said ultrasonic signal burst generation means to said plurality of conductor pairs in sequence, probe means at said field location, ultrasonic signal detection means coupled to said probe means, said ultrasonic signal detection means responsive to said signal bursts detected by said probe means and including means to disconnect said energizing source and said counting means in order to halt said counting means, and means to transmit an output signal derived from said predetermined signal state at the stages at which said counter is halted via said spare conductor pair to the field location whereby said output signal of said halted counter identifies the conductor pair to which said probe is connected.

2. The combination as claimed in claim 1 wherein said ultrasonic signal burst generation means comprises an ultrasonic signal oscillator, a pulse generator, and means to modulate the ultrasonic signal generated by said ultrasonic signal oscillator with the pulses generated by said pulse generator.

3. The combination as claimed in claim 2 wherein said ultrasonic signal detection means responsive to said signal bursts detected by said probe means comprises means to delay a portion of a detected signal burst and compare the delayed portion of the signal burst with a latter portion of an undelayed signal burst, coincidence gate means to transmit the two coincident signals comprising the delayed portion and the latter portion of said undelayed signal burst, signal transmission means connected to said coincidence gate responsive to a selected frequency of said coincident signals transmitted by said coincidence gate, and means connected to said signal transmission means responsive to a selected duration of said coincident signals transmitted by said coincidence gate and producing an indication signal in response thereto.

4. The combination as claimed in claim 3 wherein said derived output signals have a unique magnitude indicative of the numerical designation of the count at which said counter is halted, and switching means to apply said output signals to said spare conductor pair.

5. A conductor pair identification system comprising a multiconductor cable, including a plurality of conductor pairs interconnecting a central office and a field location, counting means at said central office comprising a plurality of interconnected signal switching circuits to step a specified signal state, each of said switching circuits including an output impedance having a value indicative of its numerical position, control means at said field location to supply energizing signals and coupled to said counting means to operatively drive the same with said energizing signals, means responsive to the advance of said specified signal state in said counting means at said central office to sequentially apply an ultrasonic signal burst to each of said conductor pairs, probe means at said field location to detect said ultrasonic signal burst, means to couple said probe means to said control means, said control means including means operative in response to said detected ultrasonic signal burst to halt the advance of said counting means by disconnecting said energizing signals from said counting means, said counting means including means to transmit said specified signal state to said field location through said output impedance associated with the switching circuit at which said counting means is halted, and identifying means at said filed location to uniquely identify the conductor pair to which said probe means is presently coupled by measuring the magnitude of said specified signal state.

6. Apparatus as claimed in claim 5 further including means connected to said probe means to distinguish between said ultrasonic signal bursts and random noise signals comprising means to compare the portions of an ultrasonic signal burst with a delayed portion of said ultrasonic signal burst and coincidence gate means to transmit the corresponding portions of said compared signal bursts, signal transmission means connected to said coincidence gate means responsive to only a selected frequency of said corresponding portions of said compared signal bursts, and signal generation means connected to said signal transmission means responsive to a predetermined duration of said identical portions of said compared signal bursts.

References Cited

UNITED STATES PATENTS

| | | | |
|---|---|---|---|
| 2,666,898 | 1/1954 | Meldal | 324—66 |
| 2,799,739 | 7/1957 | Lowman et al. | 324—66 XR |
| 2,822,519 | 2/1958 | Murphy | 324—66 |
| 3,054,949 | 9/1962 | Bates et al. | 324—66 |
| 3,252,088 | 5/1966 | Palmer | 324—66 |
| 3,287,509 | 11/1966 | Bohnenblust | 324—66 XR |
| 3,288,943 | 11/1966 | Bohnenblust | 324—66 XR |
| 3,288,944 | 11/1966 | Fleming | 179—175.3 |
| 3,288,945 | 11/1966 | McNair et al. | 179—175.3 |

RUDOLPH V. ROLINEC, *Primary Examiner.*

G. R. STRECKER, *Assistant Examiner.*

U.S. Cl. X.R.

179—175.3